(12) United States Patent
Eves et al.

(10) Patent No.: US 8,353,747 B2
(45) Date of Patent: Jan. 15, 2013

(54) SELECTABLE REAL-WORLD REPRESENTATION SYSTEM DESCRIPTIONS

(75) Inventors: David A. Eves, Crawley (GB); Richard S. Cole, Redhill (GB)

(73) Assignee: AMBX UK Limited, Surrey (GB)

( * ) Notice: Subject to any disclaimer, the term of this patent is extended or adjusted under 35 U.S.C. 154(b) by 1479 days.

(21) Appl. No.: 10/548,703

(22) PCT Filed: Feb. 27, 2004

(86) PCT No.: PCT/IB2004/000679
§ 371 (c)(1), (2), (4) Date: Sep. 8, 2005

(87) PCT Pub. No.: WO2004/082275
PCT Pub. Date: Sep. 23, 2004

(65) Prior Publication Data
US 2006/0218386 A1 Sep. 28, 2006

(30) Foreign Application Priority Data
Mar. 13, 2003 (GB) .................................. 0305762.7

(51) Int. Cl.
*A63F 9/24* (2006.01)
(52) U.S. Cl. ............................................................ 463/1
(58) Field of Classification Search .................. 463/1
See application file for complete search history.

(56) References Cited

U.S. PATENT DOCUMENTS

| 6,161,126 A | 12/2000 | Wies et al. | |
| 6,288,716 B1* | 9/2001 | Humpleman et al. | 715/733 |
| 2002/0010734 A1* | 1/2002 | Ebersole et al. | 709/201 |
| 2002/0169012 A1* | 11/2002 | Eves et al. | 463/1 |
| 2002/0169817 A1* | 11/2002 | Eves et al. | 709/201 |
| 2003/0061400 A1* | 3/2003 | Eves et al. | 709/321 |

FOREIGN PATENT DOCUMENTS

| DE | 10064624 A1 | 6/2002 |
| WO | 0068828 A | 11/2000 |
| WO | 0240921 A2 | 5/2002 |
| WO | 02092183 A1 | 11/2002 |
| WO | WO 02/092183 A1 * | 11/2002 |

OTHER PUBLICATIONS

Written Opinion of the International Searching Authority PCT/IB2004/000679.

* cited by examiner

*Primary Examiner* — Omkar Deodhar
(74) *Attorney, Agent, or Firm* — Burns & Levinson LLP; Bruce D. Jobse, Esq.

(57) ABSTRACT

A method of operating a set of devices comprises receiving a real-world description (30) in the form of an instruction set of a markup language, selecting a source of assets (32) for use by the set of devices, and operating the devices (34) according to the description. The source of assets can be a local store or a broadcast channel, or a combination of the two.

20 Claims, 3 Drawing Sheets

SELECTABLE REAL-WORLD REPRESENTATION SYSTEM DESCRIPTIONS

Figure 1:
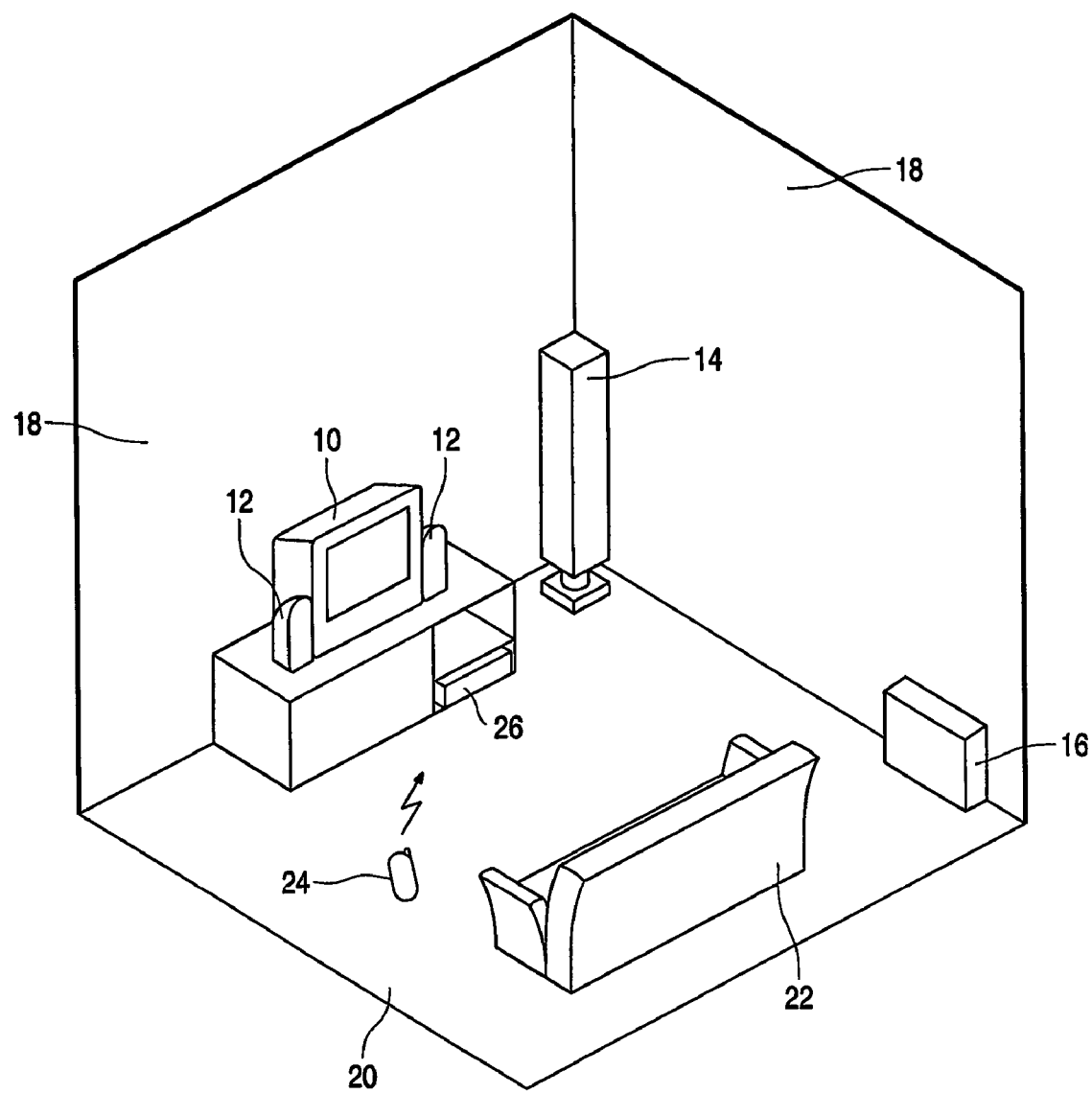

This invention relates to a method of operating a set of devices and to a system comprising a set of devices.

International patent application publication WO 02/092183 describes a real-world representation system comprising a set of devices, each device being arranged to provide one or more real-world parameters, for example audio and visual characteristics. At least one of the devices is arranged to receive a real-world description in the form of an instruction set of a markup language and the devices are operated according to the description. General terms expressed in the language are interpreted by either a local server or a distributed browser to operate the devices to render the real-world experience to the user.

In order to operate any device according to the terms of the markup language, the system has access to a specific asset for each term of the language. For example, the term <FOREST>, in a simple example, will have a specific green colour and lighting level asset associated with it. This will be stored on a device within the set and recalled as required. However, this limits the variety and choice of experience that can be provided by the system.

It is therefore an object of the invention to improve upon the known systems.

According to a first aspect of the present invention, there is provided a method of operating a set of devices comprising receiving a real-world description in the form of an instruction set of a markup language, selecting a source of assets for use by said set of devices, and operating said devices according to said description.

According to a second aspect of the present invention, there is provided a real-world representation system comprising a set of devices, each device arranged to provide one or more real-world parameters, at least one of said devices arranged to receive a real-world description in the form of an instruction set of a markup language, and a user interface for selecting a source of assets for use by said set of devices, said set of devices being arranged to be operated according to said description.

The principal advantage of the invention is that by selecting the source of the assets to be used by the set of devices, a greater variety of experiences can be rendered by the system. The user can select the source of the assets as desired. Advantageously, the source of assets comprises a local store or the source of assets comprises a broadcast channel, or a combination of the two.

Essentially, well-defined "assets" are supplied that are to be rendered as part of an existing interface framework. Changing the set of assets available to the set of devices changes the experience, but in a different way to changing the actual instruction set of the markup language. Because the "experience" rendered by the devices is described in high-level terms, which are then matched with available assets, changing the assets can essentially create the style of the resulting experience. This therefore provides the opportunity to make "channels" of assets that change the stylistic rendering of experiences without necessarily changing the experiences being accessed. This can be used to create a device that allows a user to tune into to a style of content as desired. In a similar way branded asset sets could be provided by a 3rd party.

A channel will normally only replace a part of the asset space, though practically this is always likely to be true. For example, a specific channel may deliberately replace assets relating to a particular type of character, or a branded channel may just introduce elements relating to product perception, for example, by not providing assets associated with negative emotions.

Embodiments of the present invention will now be described, by way of example only, with reference to the accompanying drawings, in which:—

Figure 2:
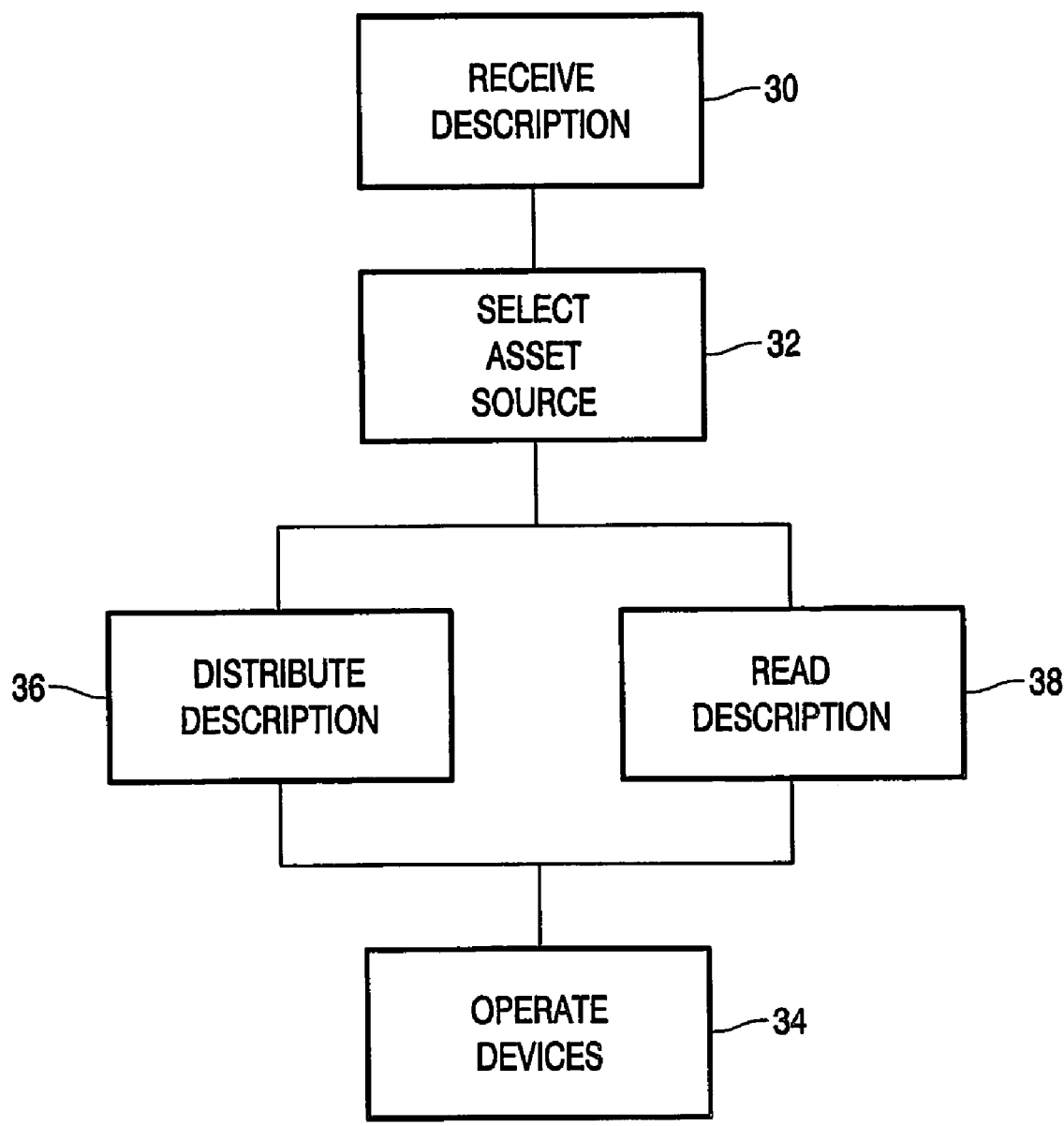
Figure 3:
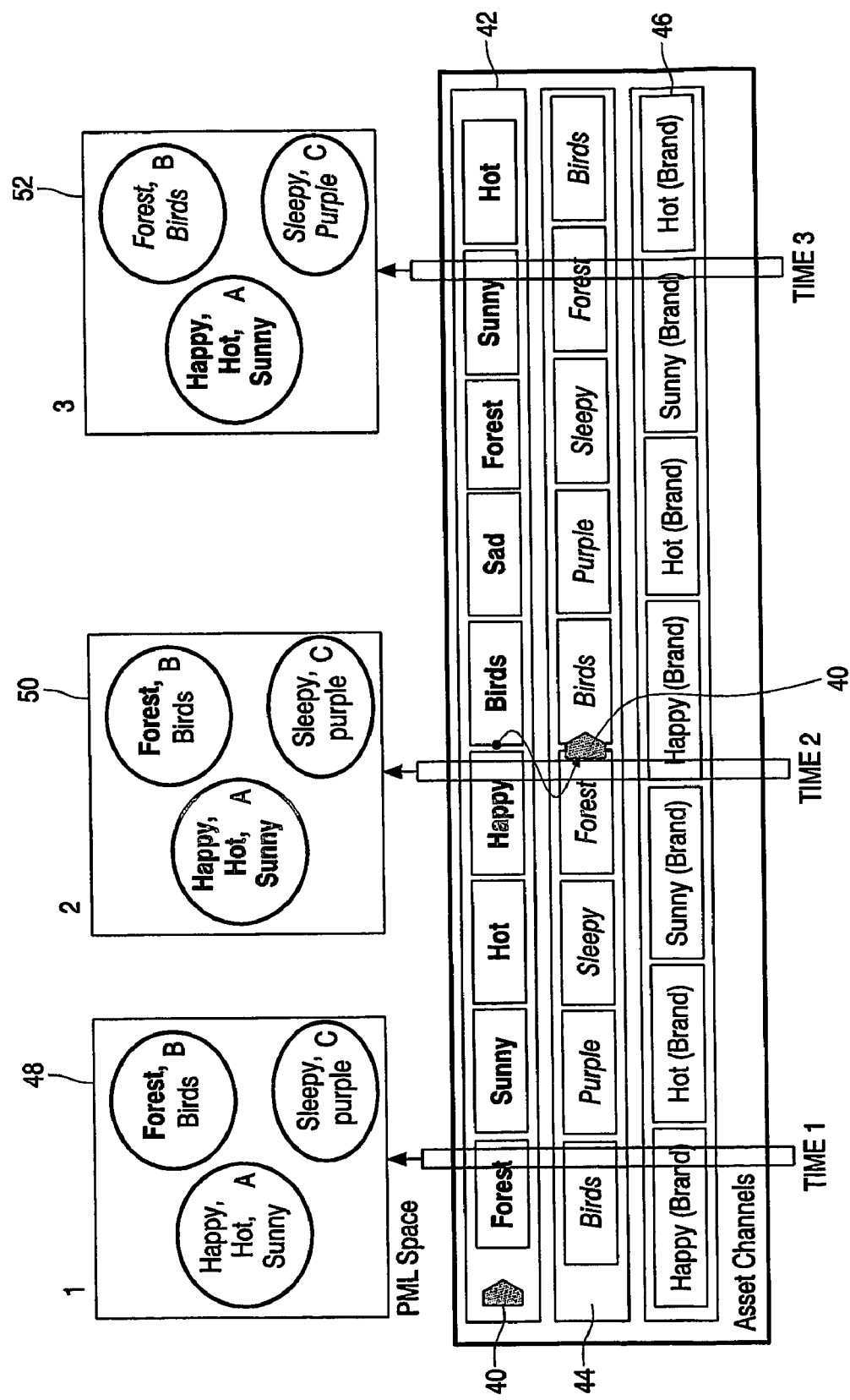

FIG. 1 is a schematic perspective view of a real-world representation system comprising a set of devices, FIG. 2 is a flow diagram of a method of operating a set of devices, and FIG. 3 is a schematic time diagram of asset channels and the corresponding instruction sets of the markup language.

In FIG. 1, the real-world representation system comprises a set of devices including a display device 10, audio speakers 12, a lighting device 14, a heating device 16, walls 18 and the floor 20. These devices together contribute to make up the ambient environment, each device being arranged to provide one or more real-world parameters. For example, the lighting device 14 contributes colour tones as well as to the luminance level. A wireless network interconnects the devices.

In addition to the display device 10, the walls 18 and floor 20 are provided with display functionality. This can be achieved either by the walls 18 and floor 20 being composed of fabric display material, or a centred ceiling projector can illuminate the visible portions of the walls 18 and the floor 20. It is also feasible to back light the walls 18 if the environment allows it.

The system of FIG. 1 is shown as being a room with a couch 22 for a user, the room being part of a private dwelling. However the room could be, for example, a hotel room or part of an entertainment complex or could form part of a public space. An additional element within the system is a user interface 24, which can be controlled by the user to select the source of the assets for use by the set of devices. The source of the assets comprises a local store 26.

At least one of the devices making up the real-world representation system is arranged to receive a real-world description in the form of an instruction set of a markup language, the devices being operated according to the description. This description could form part of a broadcast signal or it could be recalled from a local or remote store. The description could relate to an activity that a user is undertaking or could be triggered from the user interface 24 or could trigger automatically from some predefined event, for example, a user entering a room.

In a first embodiment the description is distributed amongst the devices. Each markup language enabled device operates in principally the same manner. For example, the lighting device 14 has receiving means for receiving the real-world description in the form of an instruction set of a markup language, the receiving means including part of a distributed browser that interprets the instructions of the instruction set. The portion of the browser in the receiving means communicates with adjusting means that is arranged to adjust one or more parameters of the lighting device 14.

For example, if the real-world description reads <FOREST>, <SUMMER>, <EVENING> then the browser portion in the receiving means interprets this to generate specific instructions relating to the colour tones and luminance level for the adjusting means to adjust their levels accordingly. In this example the likely colour tone would be a pleasant green and the light level would be low but warm. The browser part interprets instructions of a general type to generate specific parameter adjustments, depending upon the assets available to the browser. Each device in the set will have a basic group of assets stored on the device that allow the device to render basic terms of the instruction set. However any term in the language has a large number of possible outcomes, depending upon the asset used by the device. The user can select a source of assets depending upon their mood.

The description is received by all of the other parts of the distributed browser in each of the other devices in the real-world representation system. Each device interprets the instructions and adjusts its parameter configuration according to the asset source selected. The more enabled devices that are present in a particular environment the more realistic the end result will be. In particular the operability of the walls 18 and floor 20 as display devices will determine how immersed in the real-world representation the user feels.

In a second embodiment the description is read at a local server (not shown), which can be a dedicated device or could be contained within the capability of a device that nominally has a different purpose. In this embodiment a browser or operating system present on the local server interprets the instructions of the real-world description and generates specific parameter adjustments, based upon the selected asset source, for communicating to the relevant device. In this way devices currently available can be used without the requirement that they be modified or purpose built for use in the real-world representation system.

FIG. 2 summarises the two embodiments discussed above, the method of operating a set of devices comprising receiving 30 the real-world description in the form of an instruction set of the markup language, selecting 32 the source of assets for use by the set of devices, and operating 34 the devices according to the description. In FIG. 1, the source of assets comprises a local store 26, however, the source of assets could comprise a broadcast channel, which the user tunes into, in much they same way as a user selects a broadcast television channel to watch. FIG. 2 also illustrates the alternative steps of further distributing 36 the description amongst the devices and reading 38 the description at a local server.

The inclusion of the description in a broadcast signal allows the user to be immersed in an environment that is linked to a broadcast that he is receiving, for example a broadcast television signal. I.e. if the user is watching a film, then as the film moves through various scenes in turn these can be rendered by the set of devices making up the real-world representation system. If an underwater scene is showing on the television then the broadcast could include a description <WATER>, <COLD> and this will be interpreted by the relevant parts of the system to render the real-world experience to the user, turning the lights blue etc, using the assets available. This description can be received at all locations where there is a real-world representation system operating and each individual system will render the experience to the best of the functionality of the devices in the system.

The description can also relate directly to an activity that a user is undertaking, for example, reading a book. The individual pages of the book can trigger different descriptions being passed to the real-world representation system. Each description is linked by content to the particular theme or scene of the book at the respective point in the book. For example, the children's story "Little Red Riding Hood" has a number of discrete scenes within it, including a forest and the interior of a cottage, each of which can be rendered by the devices of the system in turn depending upon the place in the story that the reader has reached. A movement sensor may be employed to detect the turning of the pages, or the book may have inbuilt functionality that automatically detects which page the reader is looking at and triggers the appropriate description that is then rendered by the system. The triggering is ideally carried out via a wireless connection.

A user can also operate the system in a relatively simple manner from the user interface 24. The user can select an environment that they wish to be immersed in from preselected total descriptions or create a new environment from pre-or userdefined variables. Such a total description may, for example, be <CHINESE RESTAURANT>, which real-world experience is then rendered by the devices in the system. The real-worlds generated can be fantasy environments or they can be realistic.

The user can also operate the user interface 24 to set limits on the operation of the devices in the system. For example, if the user wishes to set the volume of those devices with an audio capability to a specific range or set an upper limit on the volume then they can do so via the user interface. This prevents experiences becoming unpleasant for the user. The level of the light and the rate of any change in light intensity are also things that the user can control. All of the parameters of the system can be user defined.

The selection of the source of assets used by the system is under the control of the user via the user interface 24. In practice, there will be a default set of assets used by each device in the system, and the user can select an alternative or additional source of assets. This allows the user greater control over the experience that is delivered to them and also gives content providers greater freedom to invent and design effects and environments.

In order for a system to acquire assets, many different delivery methods are possible. Content could be provided on a CD-ROM for example, or included as extra material with conventional broadcast, so that the broadcaster is broadcasting conventional video and audio, augmented with the markup language, and including specific assets relating to the terms of the included markup language. Additionally, it is possible to have a dedicated service that only supplies assets. This could be via any suitable delivery method, such as broadcast or through a web service on the Internet. Such "channels" of assets are illustrated in FIG. 3.

In FIG. 3, for simplification, three separate channels, 42, 44 and 46 are shown. In reality, many more will be available to the user. The Figure shows how a "space" changes as the channels are played through it. In this context, the term space is used to indicate the environment that is rendering the received set of instructions of the markup language.

At time 1, the space is using mainly default or existing assets to render the experience described by three objects (A, B & C). The user of the system has selected The Natural World channel (42, shown in bold) on their asset radio as shown by the arrow 40. The Natural World channel is broadcasting a wide range of assets appropriate to this experience. At time 1, only the asset for <FOREST> has been received, and this shown as bold in the diagram 48, which shows the assets being used to render the associated terms, at the time 1.

By time 2, assets have been broadcast that are being used to render the entire object A. <SUNNY>, <HOT> and <HAPPY> have been received and are shown in bold in the diagram 50. At this point however the user chooses a new channel, as shown by the arrow 40. The user has switched to The Sleepy Forest channel 44, shown in italic, which is broadcasting a smaller more specific selection of assets of a different style. At time 3 the new channel has supplied assets in this new style that fit for two of the experience objects but as this channel does not have material suitable for object A it remains as it was previously. This is illustrated by the diagram 52.

In the example illustrated in FIG. 3, the third branded channel has never been selected, but it can be seen that had such a selection been made then branded material would become associated with the "Happy Sunny" part of the experience.

Of relevance to the implementing of the asset channels is the time taken to download assets. While many types of asset need only a small amount of data, for example, the colour of a light, other assets such as audio and video material will need to either be downloaded or streamed to the rendering device. This imposes certain bandwidth requirements and also suggests that in many cases "tuning into" an asset channel would not result in an instantaneous change of style. This will depend upon the bandwidth and processing power of the system.

The invention claimed is:

1. A method of operating a set of devices, the devices having a basic group of assets associated therewith comprising:
provinding a plurality of asset channels, each channel being a source of assets,
receiving a real-world description that includes an instruction set of a markup language,
selecting an alternative source of assets, other than the basic group of assets, by switching to one of the plurality of asset channels, the assets for use by the set of devices to interpret the instruction set and adjust parameter configurations associated therewith according to the alternative source of assets selected, and
operating the devices according to the description.

2. The method of claim 1, wherein the source of assets includes a local store.

3. The method of claim 1, wherein the source of assets includes a broadcast channel.

4. The method of claim 1, including distributing the description amongst the devices.

5. The method of claim 1, including reading the description at a local server.

6. A real world representation system comprising:
a set of devices, each device arranged to provide one or more real-world parameters and having a basic group of assets associated therewith, at least one of the devices arranged to receive a real-world description that includes an instruction set of a markup language, and
a user interface for selecting an alternative source of assets from a plurality of asset channels, other than the basic group of assets, for use by the set of devices to interpret the instruction set and adjust parameter configurations associated therewith according to the alternative source of assets selected, the set of devices being arranged to be operated according to the description.

7. The system of claim 6, including a local store for storing one or more of the assets.

8. The system of claim 6, wherein a plurality of the devices are interconnected by a wireless network.

9. The system of claim 6, wherein a plurality of the devices are interconnected by a powerline carrier network.

10. The system of claim 6, wherein the set of devices includes a local server.

11. The system of claim 6, wherein the description is distributed amongst the devices.

12. The system of claim 6, wherein the at least one of the devices includes a browser that is configured to interpret the instructions based at least in part on the selected source of assets.

13. The system of claim 12, wherein the at least one of the devices includes an adjusting device that is configured to adjust at least one parameter of the device based on one or more commands from the browser.

14. The system of claim 7, wherein the local store is configured to store assets from more than one selected source of the plurality of sources.

15. The system of claim 14, wherein the local store is configured to replace an asset from a first source with a same asset from a subsequently selected second source.

16. A device comprising:
an output element that is configured to render an effect,
an adjusting device that is configured to adjust the effect, and
a receiving device that is configured to:
receive one or more assets from an alternative source of assets selected from a plurality of asset channels, other than a basic group of assets initially associated with the device,
receive a real-world description that includes a set of instructions, and
control the adjusting device by interpreting the instruction set and adjusting parameter configurations associated therewith according to the alternative source of assets received.

17. The device of claim 16, wherein the instructions are elements of a mark-up language.

18. The device of claim 16, wherein the receiving device includes a browser element.

19. The device of claim 16, including a local store that is configured to store the assets.

20. The device of claim 19, wherein the local store is configured to store assets from a plurality of selected sources, each asset being replaced by a same asset being received from a subsequently selected source.

* * * * *